June 27, 1939.  G. N. PARKER  2,163,736

CATHEAD

Filed Aug. 15, 1938

G. N. Parker,
INVENTOR

BY Victor J. Evans & Co.
ATTORNEYS

Patented June 27, 1939

2,163,736

UNITED STATES PATENT OFFICE 2,163,736

CATHEAD

George N. Parker, Shreveport, La.

Application August 15, 1938, Serial No. 225,014

2 Claims. (Cl. 242—117)

My invention relates to improvements in catheads and more particularly to catheads equipped with means whereby the latter is capable of being cooled.

One of the principal objects of my invention is to provide a cathead equipped with means whereby the latter is cooled thereby eliminating excessive heat and wear to the rope lines operating thereon.

Another object of my invention is to provide a device of the above described character which is simple in construction, durable in use, efficient in operation, and economical in manufacture.

Other objects and advantages will be apparent from the following description, appended claims and annexed drawing.

Referring to the drawing wherein like reference characters designate like parts throughout the several views.

Figures 1, 2:
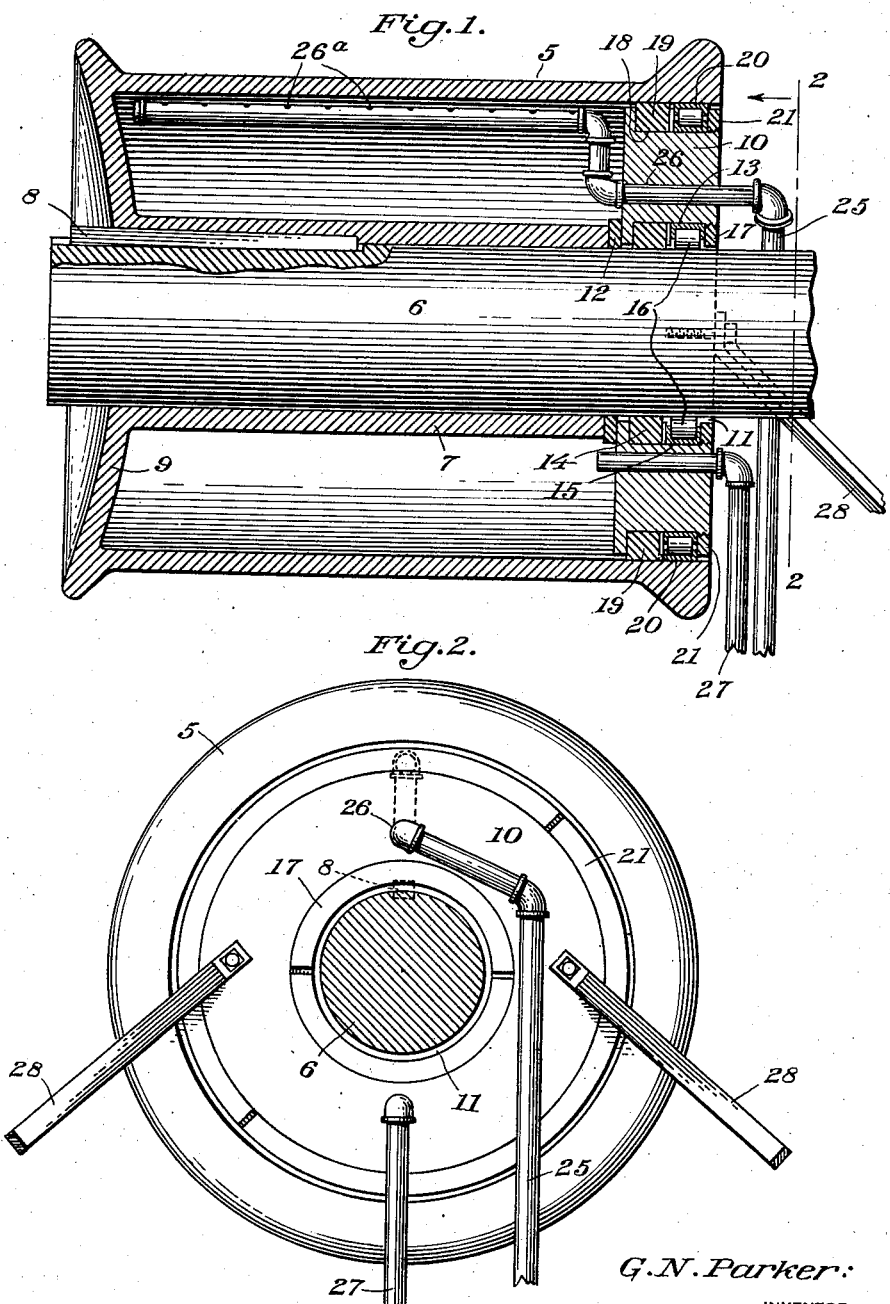
Figure 1 is a longitudinal sectional view of my invention.
Figure 2 is a sectional view thereof taken on the line 2—2 of Figure 1.

My improved form of cathead comprises a hollow spool 5 mounted on a rotatable shaft 6 by means of a centrally disposed hollow tube 7 formed integral with said spool and keyed to the shaft 6 by a key 8. One end of the spool is closed by a wall 9 integrally connecting the latter to the tube 7 and the opposite end is open. Said open end is sealed by means of a circular block 10 having a centrally disposed aperture 11 through which the shaft 6 extends, said shaft being rotatable within said aperture of the block. A packing ring 12 is mounted on the shaft between the end of the tube 7 and the inner face of the block 10 adjacent the aperture 11 whereby to effect a seal between the interior of the spool and said aperture 11. The wall of the block defining the aperture 11 is provided with a circumferentially extending cut out portion 13 in which is mounted adjacent the packing ring 12 a similar packing ring 14. Within said groove 13 and outwardly of the packing ring 14 there is also mounted a plate 15 having a plurality of roller bearings 16 mounted thereon and which engage the shaft 6. The packing ring 14 and plate 15 are secured in position within the cut out portion 13 by means of a threaded ring 17 which engages an interiorly threaded end section of the cut out portion 13. The outer peripheral face of the block 10 is also fashioned with a circumferentially extending cut out portion 18 in which is mounted a packing ring 19 effecting a seal between the interior of the spool and the outer portion of the block 10. Mounted in said cut out portion 18 adjacent the packing ring 19 is a roller bearing assembly 20 which engages the inner peripheral wall of the spool adjacent the outer open end thereof. An interiorly threaded ring 21 is threaded on an outer circumferentially extending threaded section of the block 10 whereby to secure the packing ring 19 and bearing assembly 20 in adjusted position.

A water inlet pipe 25 extends into the spool through an aperture 26 formed in the block above the shaft 6 and is disposed subjacently and in proximity with the upper section of the inner face of the spool. Beneath the upper section of the inner face of the spool, the water inlet pipe is provided with a perforated section 26a for spraying water onto the inner surface of said spool. Below the shaft 6 and extending through the block 10 is a water outlet pipe 27 whereby water is drained from said spool and said pipe 27 coacts with said pipe 25 to effect a circulation of water within the spool. A plurality of brace members 28, secured to the block, extend to a desired anchorage adjacent thereto.

From the foregoing it will be apparent that I have provided a simple and efficient device whereby a cathead is supplied with water or other suitable liquid for cooling the peripheral face thereof thereby eliminating excessive heat and wear on the rope lines operating thereover.

I claim:

1. A device of the character described, comprising, a hollow spool having opened and closed ends, a centrally disposed tube extending therethrough and integrally connected to said closed end, said tube adapted to be secured to a drive shaft extending therethrough for rotating said spool, a stationary block closing said opened end of said spool and equipped with packing rings effecting seals about said shaft and said open end, and a supply pipe extending through said block and spool and having an apertured section extending in parallism and in close proximity to the inner face of said spool whereby to cool said inner face when liquid is discharged through said apertures.

2. A device of the character described, comprising, a hollow spool having opened and closed ends, a centrally disposed tube extending therethrough and integrally connected to said closed end, said tube adapted to be secured to a drive shaft extending therethrough for rotating said spool, a stationary block closing said opened end of said spool and equipped with packing rings effecting seals about said shaft and said opened end, a supply pipe extending through said block and spool and having an apertured section extending in parallelism and in close proximity to the inner face of said spool whereby to cool said inner face when liquid is discharged through said apertures, and a liquid return pipe extending into said spool through said block and terminating adjacent said tube whereby to effect a circulation of said liquid within said spool.

GEORGE N. PARKER.